United States Patent Office 2,751,413
Patented June 19, 1956

2,751,413

DICHLORACETAMIDO NITROPHENYL-HYDROXYPROPANAL

Robert Michel Jacob, Ablon-sur-Seine, and Jacques Georges Robert, Paris, France, assignors to Parke, Davis & Company, Detroit, Mich.

No Drawing. Application August 7, 1952,
Serial No. 303,144

Claims priority, application France October 19, 1951

1 Claim. (Cl. 260—562)

This invention is for improvements in or relating to the preparation of the substituted amidopropane diol, 2-dichloracetamido-1-p-nitrophenylpropane 1:3-diol.

According to the present invention, the aforesaid compound is prepared by condensing p-nitrobenzaldehyde with dichloracetamidoacetaldehyde in the presence of a basic condensing agent and reducing the substituted propanal thus obtained by methods known for the reduction of an aldehyde to an alcohol function without effect upon a nitro group.

The condensation step is preferably effected in a suitable anhydrous organic solvent such as ether at a temperature between 0° and 25° C. in the presence of a strong organic amine e. g. a strong tertiary amine free from hydroxyl groups, such as triethylamine. Preferably, the reaction mixture is maintained out of contact with sunlight or other source of actinic rays throughout the reaction.

The product of condensation is the aldol, 2-dichloracetamido-3-p-nitrophenyl-3-hydroxypropane-1-al. It is preferred directly to use for the subsequent reduction step, crude aldol having a melting point between 135° and 140° C.

For the reduction step, there can be employed any method known to be capable of reducing an aldehyde to an alcohol function without affecting a nitro group. By "known" method is meant any method heretofore practiced or described in the chemical literature. Preferably, however, there is employed the Meerwein method using an oxidisable aluminium alkoxide, preferably one drived from a secondary aliphatic alcohol such as aluminium isopropylate, or reduction by means of an alkali borohydride, e. g. sodium or potassium borohydride, prepared for example in the manner described in United States patent specification No. 2,461,663. This latter process is preferably effected in an organic solvent medium, conveniently in methanol, dioxane or dimethylacetamide, at a temperature in the neighbourhood of room temperature, for example between 10° and 50° C. The reduction product is 2-dichloracetamido-1-p-nitrophyenylpropane 1:3-diol.

As is known, the substituted amidopropane diol prepared by the foregoing process is diastereoisomeric, the structural isomeric forms of which are designated "erythro" and "threo" respectively. The D-threo isomer is the important anti-biotic known by the common name "Chloramphenicol." The process of the present invention, which is of considerable importance as a new and useful step in the synthesis of chloramphenicol, yields a mixture containing by weight about one third of the DL-threo form and about two thirds of the DL-erythro form. This mixture is separated into its useful components by methods known per se.

The present invention is illustrated by the following example:

*Example*

61 g. of diethyl dichloracetamidoacetal are dissolved in 61 cc. of 18% hydrochloric acid at room temperature. The solution obtained is neutralized with an aqueous sodium bicarbonate solution, and then extracted with ether. By evaporation (under reduced pressure) of the ether and of the entrained alcohol, crude dichloracetamidoacetaldehyde is obtained, which is treated with an ethereal solution of 18.9 g. of p-nitrobenzaldehyde in 1.3 litres of ether. 50 cc. of anhydrous triethylamine are added and the mixture is left for 2 hours in darkness, at room temperature. The gelatinous precipitate formed is filtered and washed with a mixture of equal proportions of methanol and ether. The product is dried in vacuo and 25 g. of aldol having a melting point of 135°-140° C. are obtained. This aldol is dissolved in 200 cc. of methanol. 4 g. of potassium borohydride are gradually added with agitation at room temperature. The solution is then taken up in 200 cc. of water and 25 cc. of 4 N caustic soda. The product is neutralized with 48 cc. of 4 N sulphuric acid and extracted with ether. On evaporation of the ether, the resulting residue is dissolved in water. A product crystallises, which is filtered off and dried in vacuo. 20.6 g. of a product melting at 140° C. are obtained, this product being a mixture of about ⅓ of DL-threo 2-dichloracetamido-1-p-nitrophenylpropane 1:3-diol and ⅔ of the corresponding DL-erythro epimer.

The diethyl dichloracetamidoacetal (B.P.$_{0.1}$=110°-120° C.)

employed as starting material is obtained by the action of methyl dichloracetate on diethylaminoacetal.

We claim:

2 - dichloracetamido-3-p-nitrophenyl-3-hydroxypropane-1-al.

References Cited in the file of this patent

UNITED STATES PATENTS

| | | |
|---|---|---|
| 2,483,885 | Crooks et al. | Oct. 4, 1949 |
| 2,628,975 | Jacob et al. | Feb. 17, 1953 |

FOREIGN PATENTS

| | | |
|---|---|---|
| 500,438 | Belgium | Jan. 31, 1951 |
| 500,461 | Belgium | Jan. 31, 1951 |
| 501,176 | Belgium | Feb. 28, 1951 |
| 513,570 | Belgium | Sept. 15, 1952 |